United States Patent [19]

Smith

[11] Patent Number: 5,548,466
[45] Date of Patent: Aug. 20, 1996

[54] HAZARDOUS AMEPRAGE RECOGNITION AND RELAYING TECHNIQUES

[76] Inventor: Marcus A. Smith, 228 Manor Dr., Beckley, W. Va. 25801

[21] Appl. No.: 336,115

[22] Filed: Nov. 4, 1994

[51] Int. Cl.⁶ ........................... H02H 3/16
[52] U.S. Cl. ............... 361/44; 361/48; 361/113
[58] Field of Search ............... 361/46, 48, 50, 361/113

[56] References Cited

U.S. PATENT DOCUMENTS

| | | | |
|---|---|---|---|
| 3,794,884 | 2/1974 | Sircom | 317/18 |
| 3,879,639 | 4/1975 | Sircom | 317/18 |
| 4,063,815 | 10/1977 | Sircom | 361/42 |
| 4,200,836 | 4/1980 | Okada et al. | 324/51 |
| 4,279,007 | 7/1981 | Shimp | 361/47 |
| 4,296,450 | 10/1981 | Paice et al. | 361/50 |
| 4,321,643 | 3/1982 | Vernier | 361/48 |
| 4,389,694 | 6/1983 | Cornwell, Jr. | 361/48 |
| 4,812,752 | 3/1989 | Preuss | 324/542 |
| 5,426,553 | 6/1995 | Kim | 361/44 |

*Primary Examiner*—Todd DeBoer
*Attorney, Agent, or Firm*—Millen, White, Zelano & Branigan, P.C.

[57] ABSTRACT

The present invention is directed to a system for sensing fault current flowing through a person who touches an exposed conductor in a cable connecting a machine to a power distribution center wherein the power distribution center has a number of power cables for connecting a number of machines thereto. Each power cable has a different frequency impressed thereon by an oscillator which frequency is transmitted through an electrical path including the power center if the operator touches the fault. A sensing circuit for each cable is connected in the electrical path and tuned to only the frequency applied to that cable. When the sensing circuit detects that frequency, the sensing circuit interrupts power to the cable. If, for some reason, the sensing circuit fails to interrupt power to the cable, within a selected time interval of less than one-half second, a backup system interrupts power to the entire power center. In order to detect ground faults, the ground conductor in each cable is grounded to the power center's frame through a zener diode bank which is in parallel with a high pass capacitor connected thereto by a preventive resistor. The zener diode bank also suppresses intermachine arcing should two machines touch or come into close proximity. In addition to ground faults, broken ground wires are detected by connecting each ground wire through a preventive resistor to a signal monitor. If a ground wire breaks, the signal monitor for that cable alerts the sensing circuit for that cable, and the sensing circuit interrupts power to the cable.

14 Claims, 15 Drawing Sheets

5,548,466

HAZARDOUS AMEPRAGE RECOGNITION AND RELAYING TECHNIQUES

FIELD OF THE INVENTION

The present invention relates to methods of and apparatus for hazardous amperage recognition and relaying. More particularly, the present invention relates to methods of and apparatus for recognizing hazardous amperage and relaying detection thereof to a system for interrupting transmission of the hazardous amperage.

BACKGROUND OF THE INVENTION

In coal mines and at other mining, industrial and building sites, electrical cables are subject to repeated environmental and mechanical stress which damage and degrade the cables by opening cracks and pin holes through insulation. These cracks and holes may eventually expose line conductors which present a life threatening hazard to miners and workers.

Of the cracks and openings in cables, pin holes are the most dangerous because a person is completely unaware of the opening's existence. Contact with a conductor through a pin hole often has a lethal result. Current or amperage (amps) is the physical phenomenon that damages a human and is therefore the most important parameter to monitor and control. At the voltage level, driving most mining, construction and industrial machinery, an amperage of only ten milliamps (0.010 Amperes) at a frequency of 60 Hz is sufficient to be lethal.

The amount of amperage that would flow through the body after contacting an exposed electrical cable is governed by Ohm's law, i.e.; voltage=amperage times resistance or amperage=voltage/resistance. The significance of this equation and its relation to hazardous amperage in operations such as coal mining is evident from the following example. A high enough internal resistance to voltages which puncture the skin and negate the effect of skin resistance is selected to be about ten thousand (10,000) ohms, which is high for any human but is selected to provide a safe upper limit. Considering a coal miner's activities as an example, as the miner is repositioning a 277 volt trailing cable of a shuttle car, the miner grabs the cable in a location where a conductor therein is exposed by a pin hole. From ohm's law, the amperage flowing through the coal miner is 277 volts divided by 10,000 which equals 0.0277 amperes or 27 milliamps, an amperage exceeding 10 milliamps which is more than enough amperage to present a lethal threat to the coal miner.

Research has shown consistently that a high percentage of electrical coal mining accidents, including some fatalities, are the direct result of a miner contacting an exposed electrical cable. There are many types of faulty conditions for which protective relaying is provided. However, to date, no reliable protection has been provided effectively in coal mines to minimize this cause of injury and fatality.

SUMMARY OF THE INVENTION

It is a feature of the present invention to provide a new and improved system for protecting humans from hazardous amperage.

In view of this feature and other features, the present invention is deployed with a power distribution center that powers a plurality of electrical machines, each of which is connected to the power center by a separate cable. According to the method and apparatus of the present invention, each cable has a different selected frequency impressed thereon which is transmitted therethrough with the current used to power the associated machine. Upon a person touching an open conductor in one of the power cables, current flows through the person and through a ground path back to the power center. The frequency of the particular cable touched is transmitted with the current and sensed by a sensing circuit which interrupts current to the cable being touched.

In a further aspect, the present invention utilizes a backup circuit which, after a selected time interval, interrupts power to the power center if power to the cable having an exposed conductor is not interrupted.

In still a further aspect of the invention, broken ground wires are detected by monitoring ground wires associated with each power cable. The ground wires are connected to signal monitors through a resistor which assures appropriate protective relaying of a broken ground wire.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
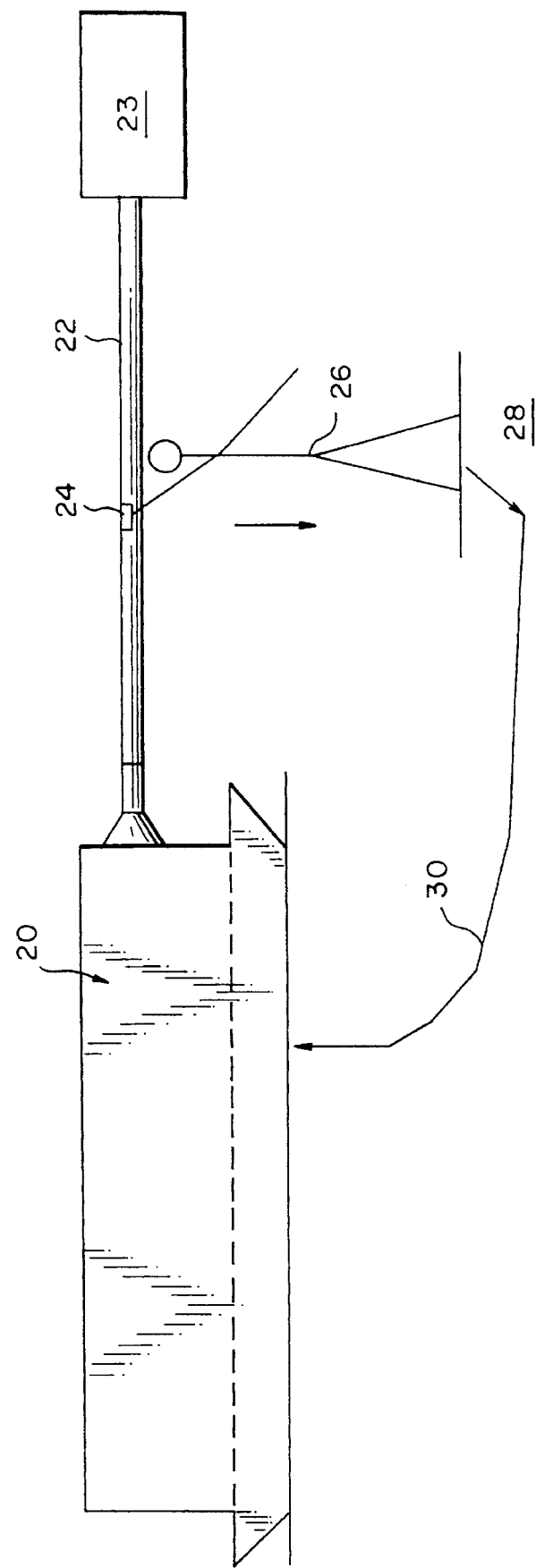
FIG. 1 is a schematic view illustrating a power center, cable and fault current returning to the power center through a human, thereby exposing the human to hazardous current.

Referring now to FIG. 1, there is shown a power center 20 having a power cable 22 delivering stepped down voltage to an electrical machine 23, which power cable is touched at a fault location 24 by a miner 26 who is standing on the earth or ground 28. When the miner 26 grasps or otherwise touches the cable 22 at the fault 24, fault current flows through the miner and ground 28 over the ground path 30 back to the power center 20. In a mine, the current passing through the miner 26 is 60 Hz at a voltage level of usually 480 or 995 volts. If the amperage in the ground path 30 exceeds 10 milliamps, it is sufficient to be lethal to the miner 26.

Figure 2:
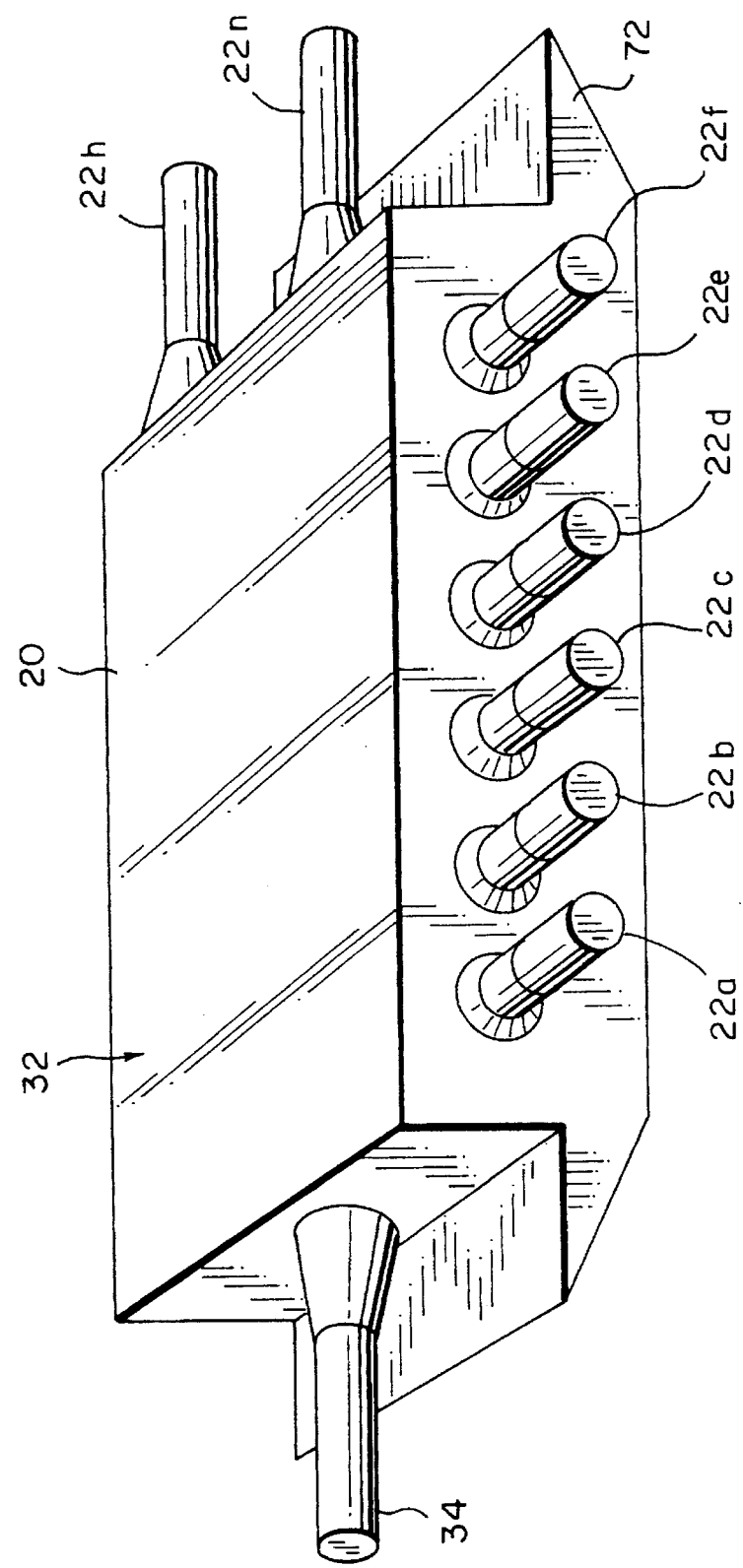
FIG. 2 is a perspective, schematic view of the power center illustrating a plurality of outgoing cables.

Referring now to FIG. 2, there is shown a distribution network of a conventional configuration which comprises a frame 32 of the power center 20 containing primary and secondary transformers for distributing incoming power from an incoming main 34 to a plurality of distribution cables 22a–22n with "n" being the final number of cables. Typically, the power on the incoming main 34 is 4160 phase to phase (p-p) volts at 60 Hz which is then stepped down to either 995 p-p volts or 480 p-p volts for distribution by the outgoing power cables 22. By way of illustration, the power center within the frame 32 may run fifteen machines 23a–23n with fifteen outgoing cables 22a–22n which may, for example, have three machines 23a–23c running on 995 volts and twelve machines 23d–23o on 480 volts. The frame 32 is grounded in a conventional manner by a grounding conductor (not shown) in the incoming main 34 which connects the frame to a grounding bed at the power source (not shown) for the incoming main.

Figure 3:
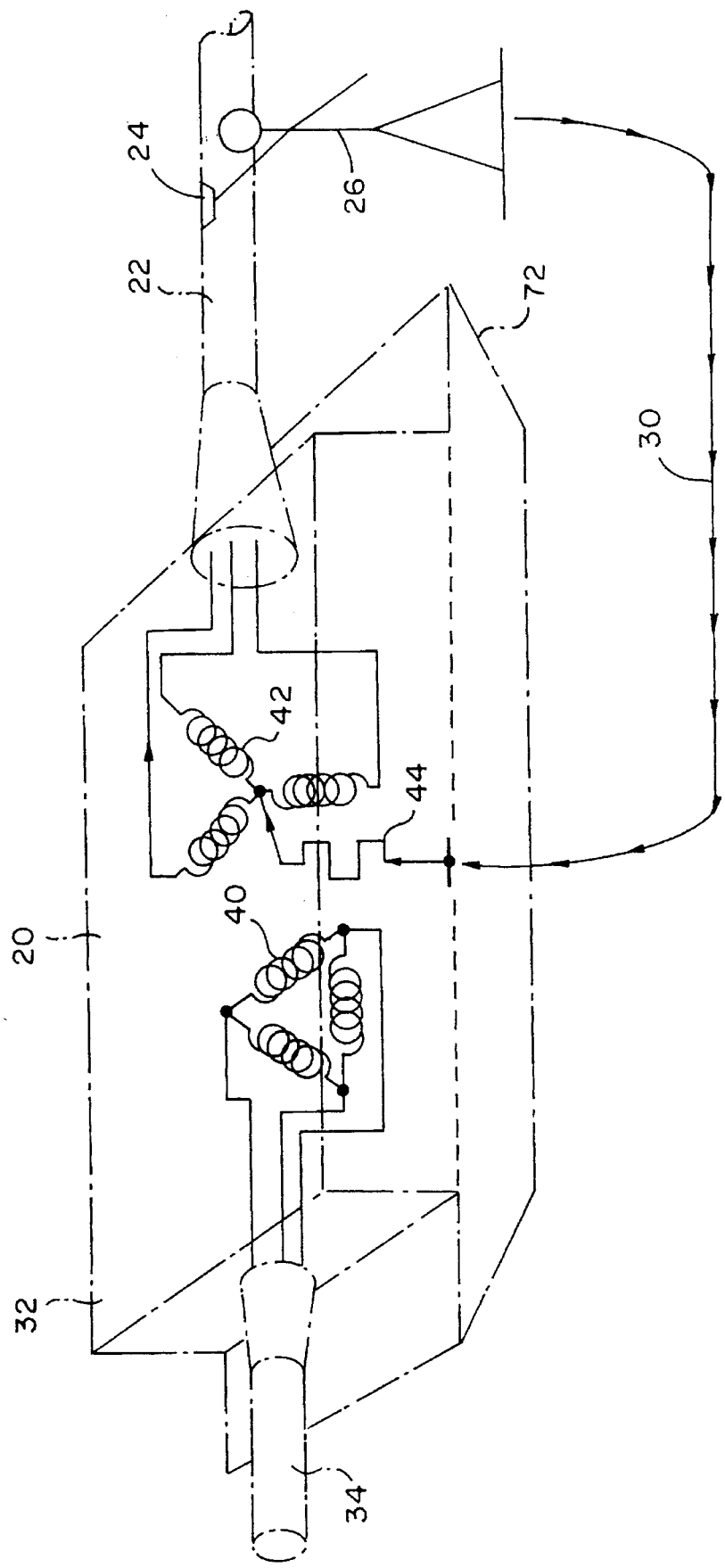
FIG. 3 is a perspective schematic view of a frame of the power center with a transformer therein and an output cable contacted by a miner.

Referring now to FIG. 3, wherein for purposes of clarification, only one outgoing cable 22 of the plurality of cables 22a–22n is shown, it is seen that the incoming power cable 34 is connected to primary transformer windings 40 which excite secondary transformer windings 42. The secondary transformer windings 42 are connected to the outgoing cable 22 which has the fault 24 contacted by the miner 26 that results in fault current returning the current to the frame 32 via a ground current path 30. A grounding resistor 44 grounds the secondary transformer 42 to the power center frame 32 providing a return path for the ground current to the secondary transformer which is flowing through the miner 26.

Figure 4:
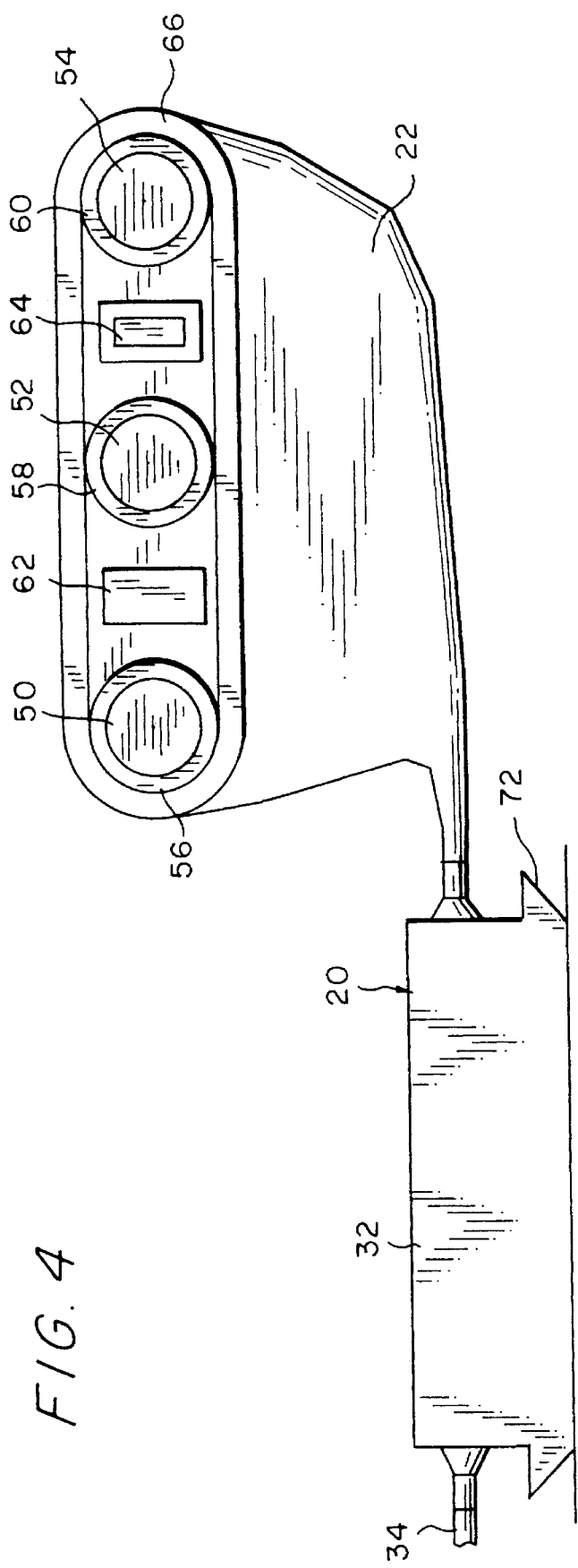
FIG. 4 is a partially schematic view with a trailing cable shown in cross-section.

Referring now to FIG. 4, where one of the cables 22 is shown in cross-section, the cable may be a trailing cable attached to a mobile machine and comprises three conductors 50, 52 and 54 surrounded by layers of insulation 56, 58 and 60. Disposed between the phase conductors 50 and 52 is a ground wire 62 and disposed between the phase conductors 52 and 54 is another ground wire or a ground check wire 64. The entire assembly of phase conductors and insulated ground wires are encased in an outer layer of insulation 66.

Figure 5:
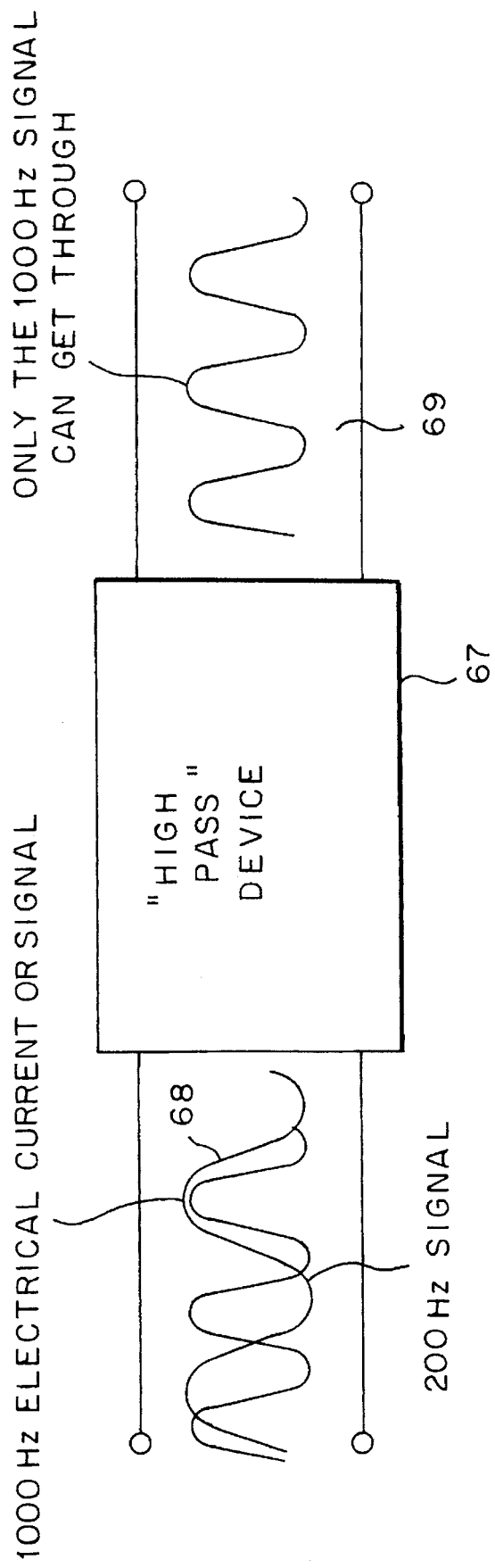
FIG. 5 is a schematic illustration of a high pass filter device.

Referring now to FIG. 5, there is shown a "high pas" device 67 which has a threshold frequency of 500 Hz. When a signal 68 having both 200 Hz and 1000 Hz current is applied to the device, only the 1000 Hz passes to output line 69. As will be explained hereinafter, this arrangement is used to accomplish fault detection in the present invention.

Figure 6:
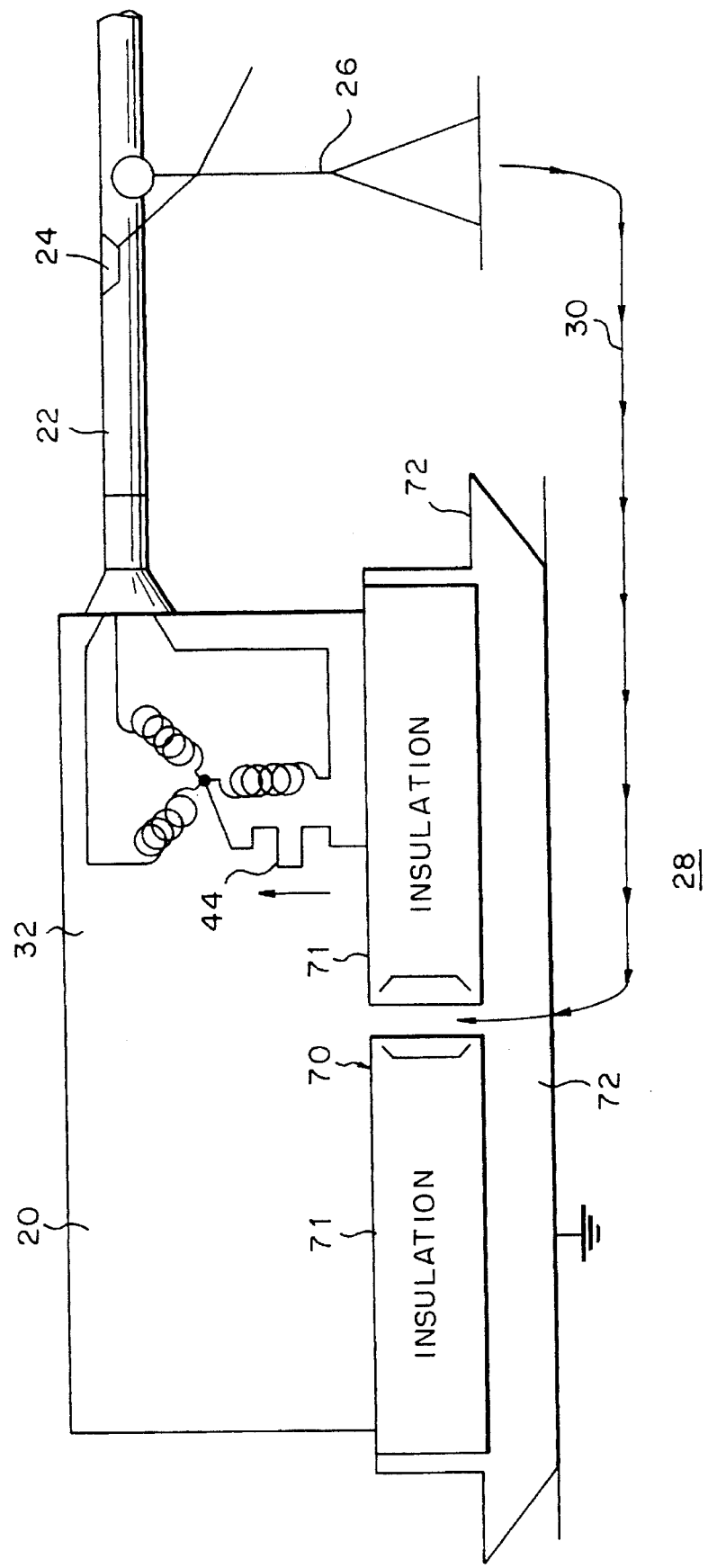
FIG. 6 is a schematic view of a frame of a power center broadly illustrating the fault detection concept according to the present invention.

Referring now to FIG. 6, which generally discloses the techniques of the present invention, it is seen that the power center 20 is reconfigured to sense deadly fault current flowing through the miner 26 over the path 30 before it returns to the power center 20. In accordance with the present invention, the fault current of ground path 30 passes through a reconfigured portion of the power center frame 32 referred to hereinafter as the designator conductor 70. The fault current passes through the designated conductor 70 because the power center frame 32 is insulated from the base 72 of the power center 20 which base rests on the earth 28 and is electrically connected thereto. The base 72 should be unpainted and preferably kept free of rust on the bottom surface thereof to ensure a good electrical connection to earth unless other techniques are used.

In accordance with the present invention, different frequencies or signals are placed on each cable 22 leaving the power center 20 used to power mining machinery 23 connected thereto. As will be further explained hereinafter, this enables the particular frequency of a faulty cable 22 to be sensed by a sensing system such as that of FIG. 7 configured in accordance with the principles of the present invention. For example, one frequency of 10 volts at 1000 Hz is placed on each of the three phase conductors 50, 52 and 53, within one of the cables 22 which may be, for example, a trailing cable.

Figure 7:
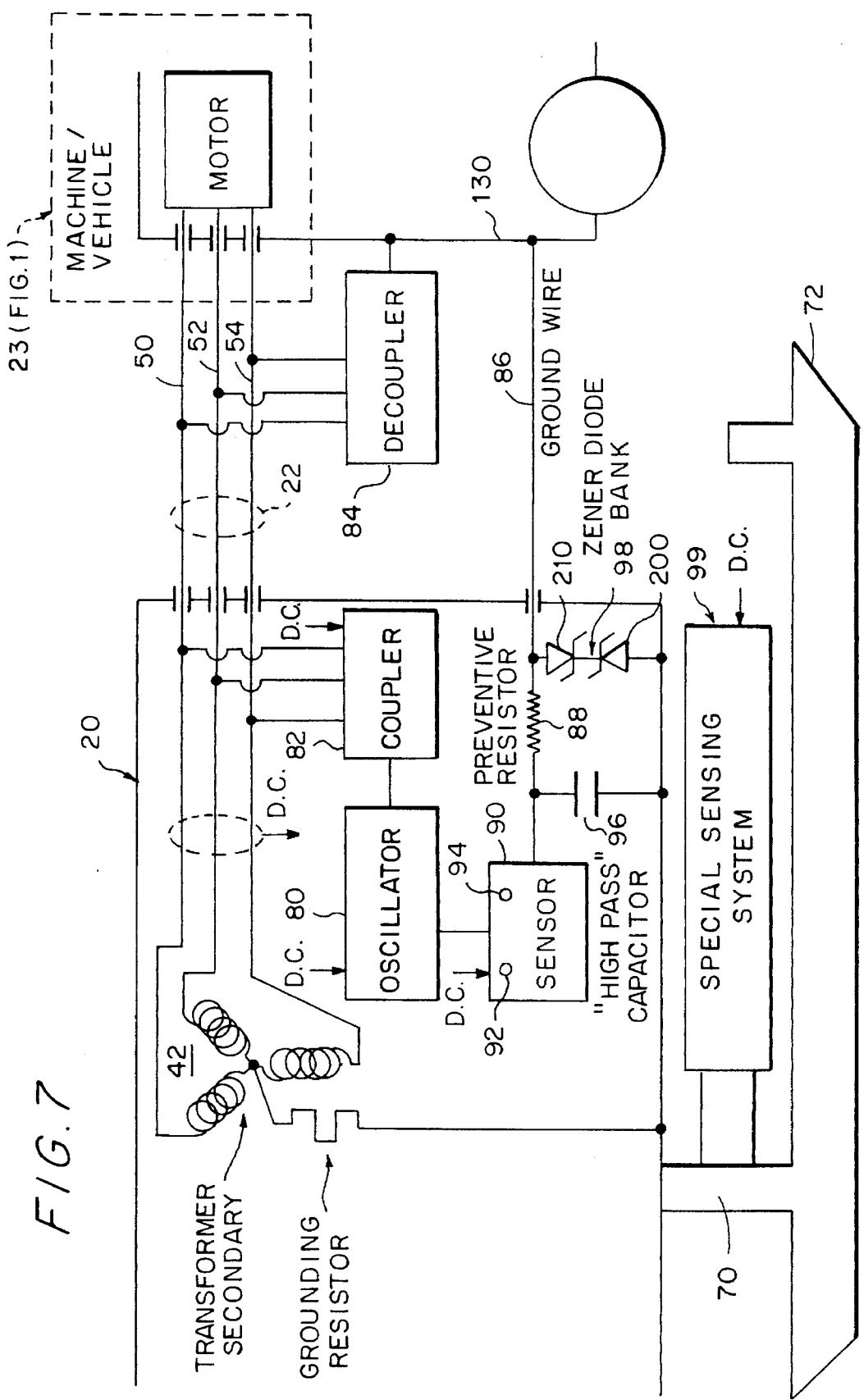
FIG. 7 is schematic view illustrating a fault detection and decoupling system in accordance with the present invention.

Referring now to FIG. 7, it is seen that for each cable 22 leaving the power center 20, there is an oscillator 80, a coupler 82 and a decoupler 84. The oscillator 80 produces a signal of, for example, 10 volts at 1000 Hz, and applies it to the coupler 82 which in turn impresses the signal onto each of the phase conductors 50, 52 and 54, as well as blocking the large phase conductor signal so that it does not damage the oscillator 80. The decoupler 84 which is located on the machine 23 (which may be a vehicle receiving power from the power center 20) removes the oscillator signal from the three phase conductors 50, 52 and 54, and returns it to the oscillator 80 along a ground wire 86 which may, for example, be ground conductor 64 of FIG. 4 so as to complete the necessary electrical path for the oscillator signal. Before the signal enters the oscillator 80, it passes through a preventive resistor 88 and a sensor 90. The sensor has a green light 92 providing a visual indication of correct operation and a red light 94 indicating incorrect operation or a fault. A high pass capacitor 96 cooperates with the preventive resistor 88 and a zener diode bank 98 in a manner which will be subsequently discussed.

By utilizing the arrangement of FIG. 7, a unique system of sensing fault current along fault current path 30, provides specific protective relaying to trip an appropriate circuit breaker in order to remove power from the particular trailing cable or other cable 22 where a fault is occurring. The sensing apparatus 99 is electrically located in the fault current sensing region in a manner described more fully in FIG. 8.

Figure 8:
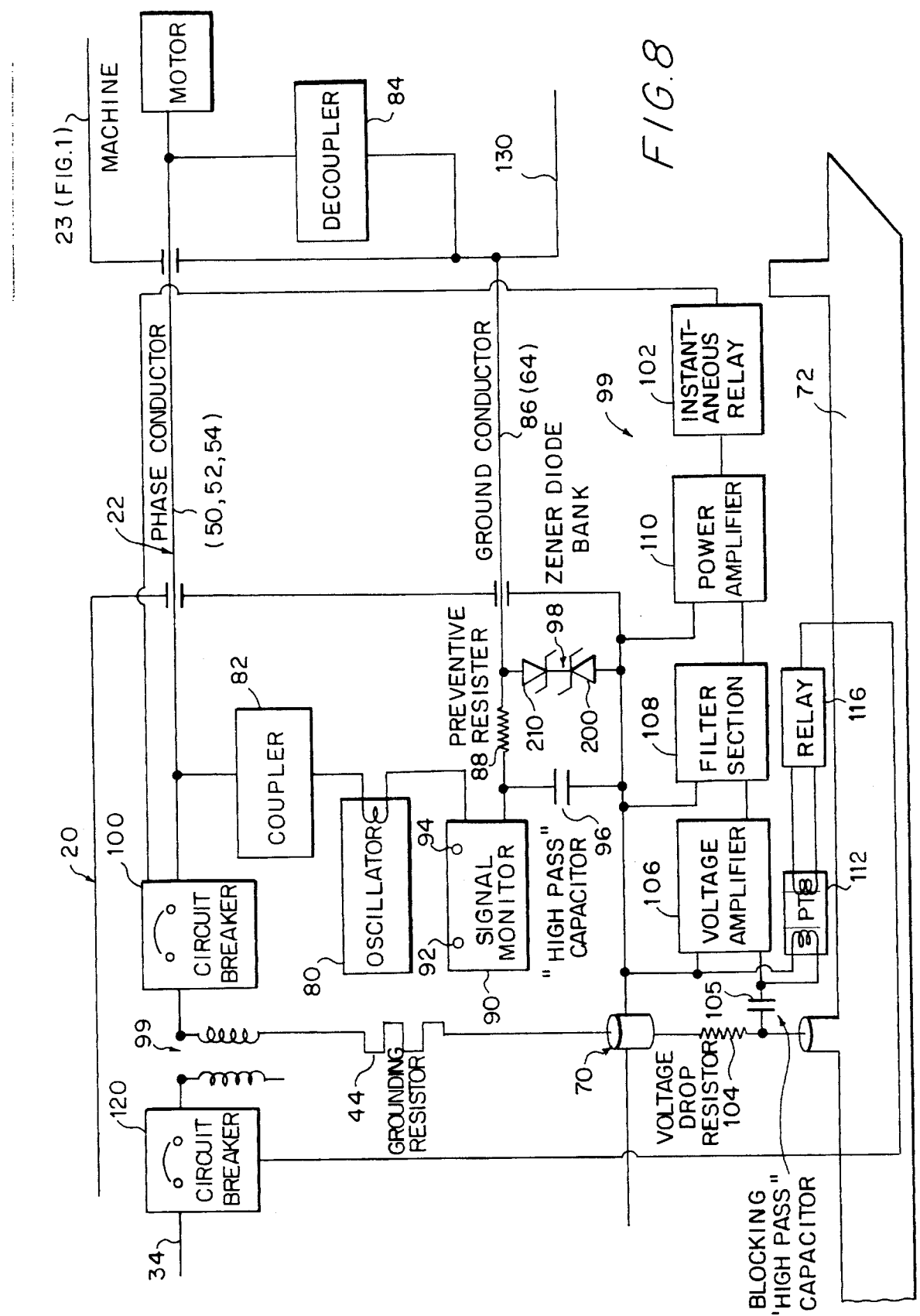
FIG. 8 is a schematic view illustrating the system of FIG. 7 in greater detail.

As is seen in FIG. 8, each phase conductor 50, 52 or 54 comprising the cable is connected to a circuit breaker 100 which has connected thereto a relay 102. The relay 102 is an instantaneous relay which trips its respective circuit breaker 100 when a special frequency is sensed. When the sensing apparatus illustrated in FIG. 8 senses a frequency indicating that there is a fault occurring, the apparatus sends a signal to the relay 102 and the relay trips the circuit breaker 100, thereby removing three phase power from the cable 22 so as to prevent injury or death to the miner 26 (see FIGS. 1–3 and 6).

The sensing apparatus illustrated in FIG. 8 comprises five major components, i.e., a voltage drop resistor 104, a voltage amplifier 106, a filter section 108, a power amplifier 110, and the instantaneous relay 102. A potential transformer 112 provides back-up for the system of FIG. 8 and will be discussed in more detail hereinafter.

The voltage drop resistor 104 provides a voltage of a level low enough to be measured by the sensing apparatus of FIG. 8. The voltage drop resistor is disposed in the middle of the designating conductor 70. When fault current passes through the voltage drop resistor 104, a voltage or voltage drop will appear across the voltage drop resistor equal to the product of the amount of fault current times the value of the resistor in accordance with Ohms Law. The voltage which appears across the voltage drop resistor 104 also appears across the terminals of the voltage amplifier 106 and is amplified prior to application to the filter section 108. The filter section 108 contains a smoothing filter which removes electrical noise and provides a smooth output signal as well as a band pass filter for each of the cables 22. Frequencies other than the special frequency to which the band pass filter is tuned cannot pass through the band pass filter but are filtered out. For example, as is seen in FIG. 5, a high pass filter device will filter out a 200 Hz signal from a combined signal comprising the 200 Hz signal and a 1000 Hz signal to provide only a 1000 Hz output signal. Each band pass filter in the filter section 108 allows only one frequency applied to the associated cable 22 to pass therethrough. Accordingly, there must a band pass filter (FIG. 5) for each cable 22 connected to the power center 20. Frequencies other than the special frequency for which the particular band pass filter is tuned do not pass through the filter but are filtered out. Accordingly, if a signal passes through a particular band pass filter in the filter section 108, it is known that a fault is occurring and that the fault is on the cable 22 connected to the filter. Upon passing through the band pass filter in the filter section 108, the signal passes to the power amplifier 110 and the power amplifier adds current to the signal so that the instantaneous relay 102 will recognize the signal and instantaneously trip the circuit breaker 100. In accordance with the preferred configuration, there is a single voltage amplifier 110 in the sensing apparatus; however, with respect to all of the other components of the sensing apparatus, there is one component for each cable 22 leaving the power center 20.

The potential transformer 112 provides backup protective relaying with a relay 116. The relay 116 does not actuate instantaneously as is the case with the instantaneous relay 102 but rather has a short time delay. Should the system connected to the instantaneous relay 102 not operate correctly, the potential transformer 112 will pick up the voltage that appears across the terminals of the voltage drop resistor 104 and, after a short time delay, trip a circuit breaker 120 located on the main cable 34 (see FIGS. 2 and 3) which applies power at 4160 p-p volts to the power center 20.

Figure 9:
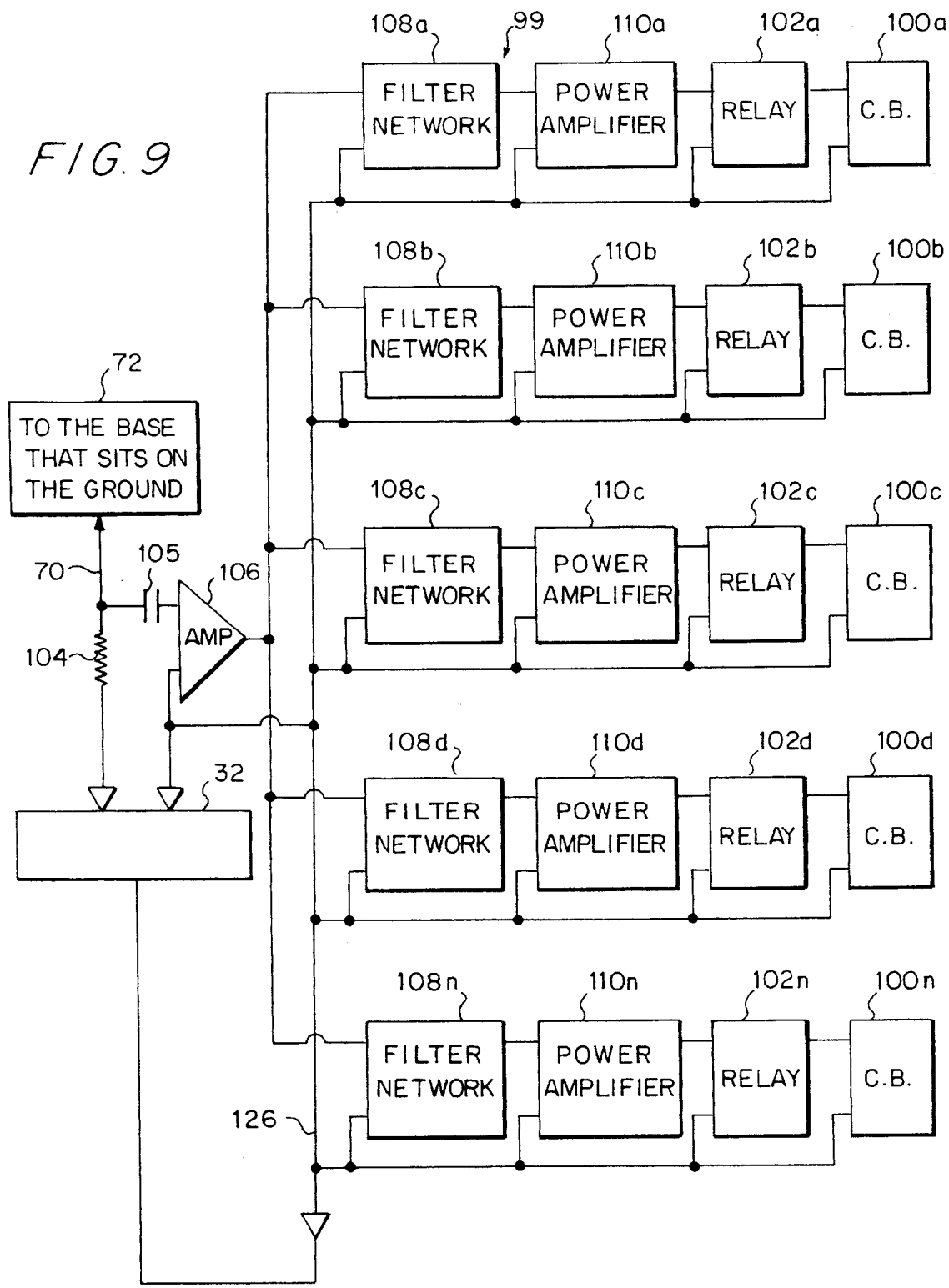
FIG. 9 is a schematic diagram illustrating the principles of the present invention applied to a plurality of coal mining machines.

Referring now to FIG. 9 where a block diagram for the sensing circuit in a power center 20 is shown for a plurality of output cables 22a–22n, it is seen that the sensing circuit 99 includes a plurality of filter sections 108a–108n ("n" being the total number), a plurality of power amplifiers 110a–110n, a plurality of instantaneous relays 102a–102n and a plurality of circuit breakers 100a–100n. In each case, the designator "n" simply means the last component in a selected number of components. For example, five components are shown but the number may be fifteen or any other reasonable number of components. As was previously stated, a single voltage amplifier 106 receives voltage inputs from the voltage drop resistor 104 which is between the base 72 and frame 32, amplifies the voltage thereof and applies it to each of the filter sections 108, power amplifiers 110, relays 102 and circuit breakers 100. The blocking high pass capacitor 105 and voltage drop resistor 104, limit the frequencies and power of signals applied to the sensor circuit 99. A grounding bus 126 connects the filter networks 108, power amplifier 110, relay 102 and circuit breaker 100 to the frame 32 so as to provide a common ground for each component.

Further with respect to FIG. 9, assuming that the letter "n" is 15, there will be fifteen oscillators 80 (see FIG. 8) for each circuit a–n and each circuit will have the same voltage but different frequencies. For example, if all of the oscillators produce a signal at 10 volts, the frequencies will increment from 5000 Hz to 20,000 Hz in 1000 Hz increments. Accordingly, there will be fifteen 10 volt signals, each of a different frequency. For each oscillator 80a–80n, there will be one of fifteen couplers 82a–82n, one for each oscillator. The couplers 82a–82n apply their respective oscillator signals to the three phase conductors 50, 52 and 54 (see FIG. 4) of their respective cables 22a–22n. At the ends of the cables 22a–22n on the machines 23, fifteen decouplers 84a–84n pull off oscillator signals from their respective cables 22a–22n and return them via ground conductors 86a–86n to the sensing circuits 99. The output of each decoupler 84 is also grounded to the frame 130 of its respective machine 23. Accordingly, signals come out of the decouplers 84, enter the frames 130 of the machines 23 and travel back down the ground wires 86 to the power center 20. The signals then pass through the preventive resistors 88 and into the signal monitors 90 (see FIG. 7) and thereafter re-enter the respective oscillators 80.

In accordance with the present invention, the fifteen sensors in the sensor system 90 monitor, the presence of fifteen signals and show green lights 92 when the system is operating correctly and red lights 94 when operating incorrectly.

Figure 10:
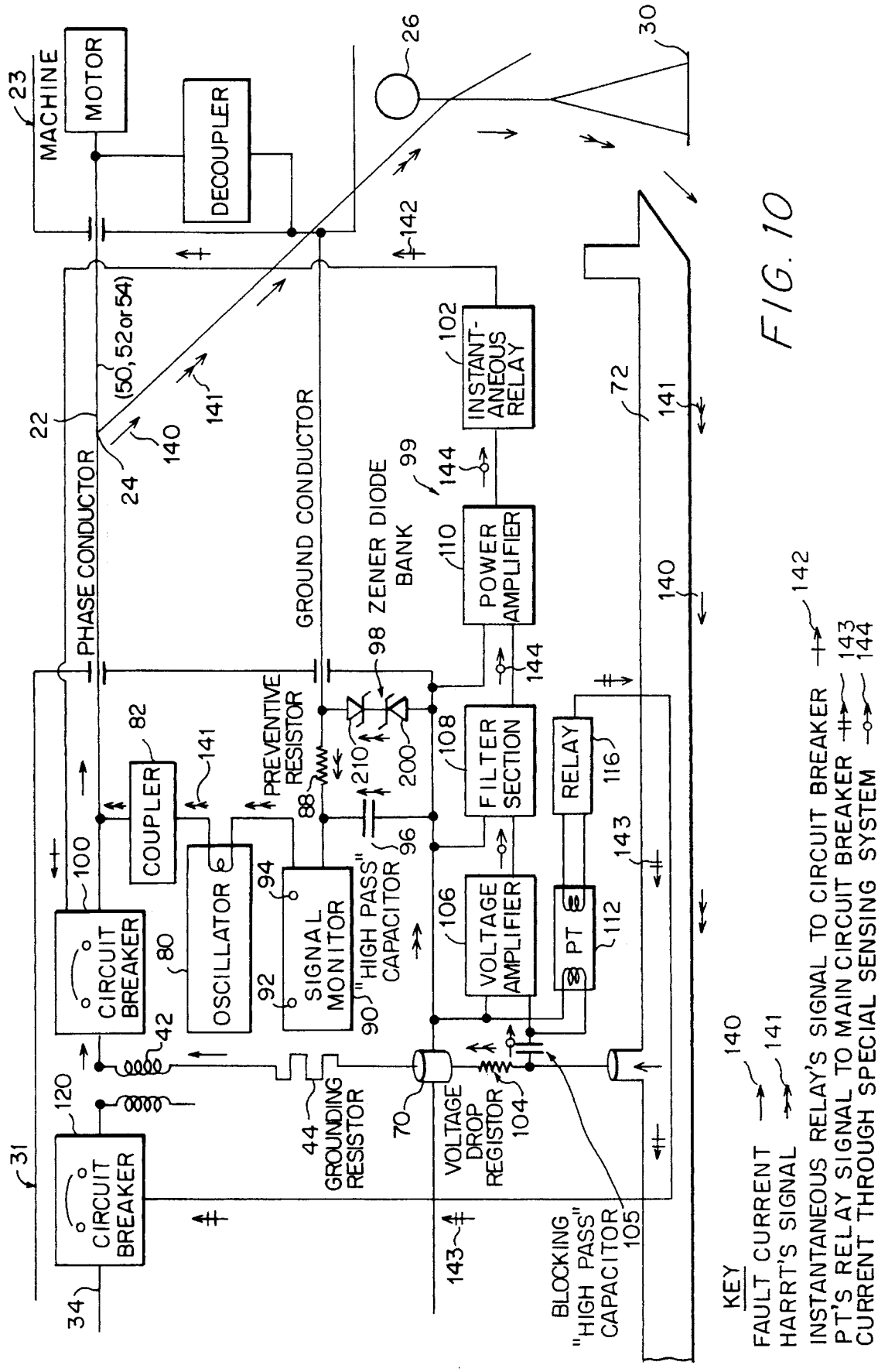
FIG. 10 is a schematic view similar to FIG. 8 illustrating a current path analysis of the system in accordance with the present invention.
Figure 11:
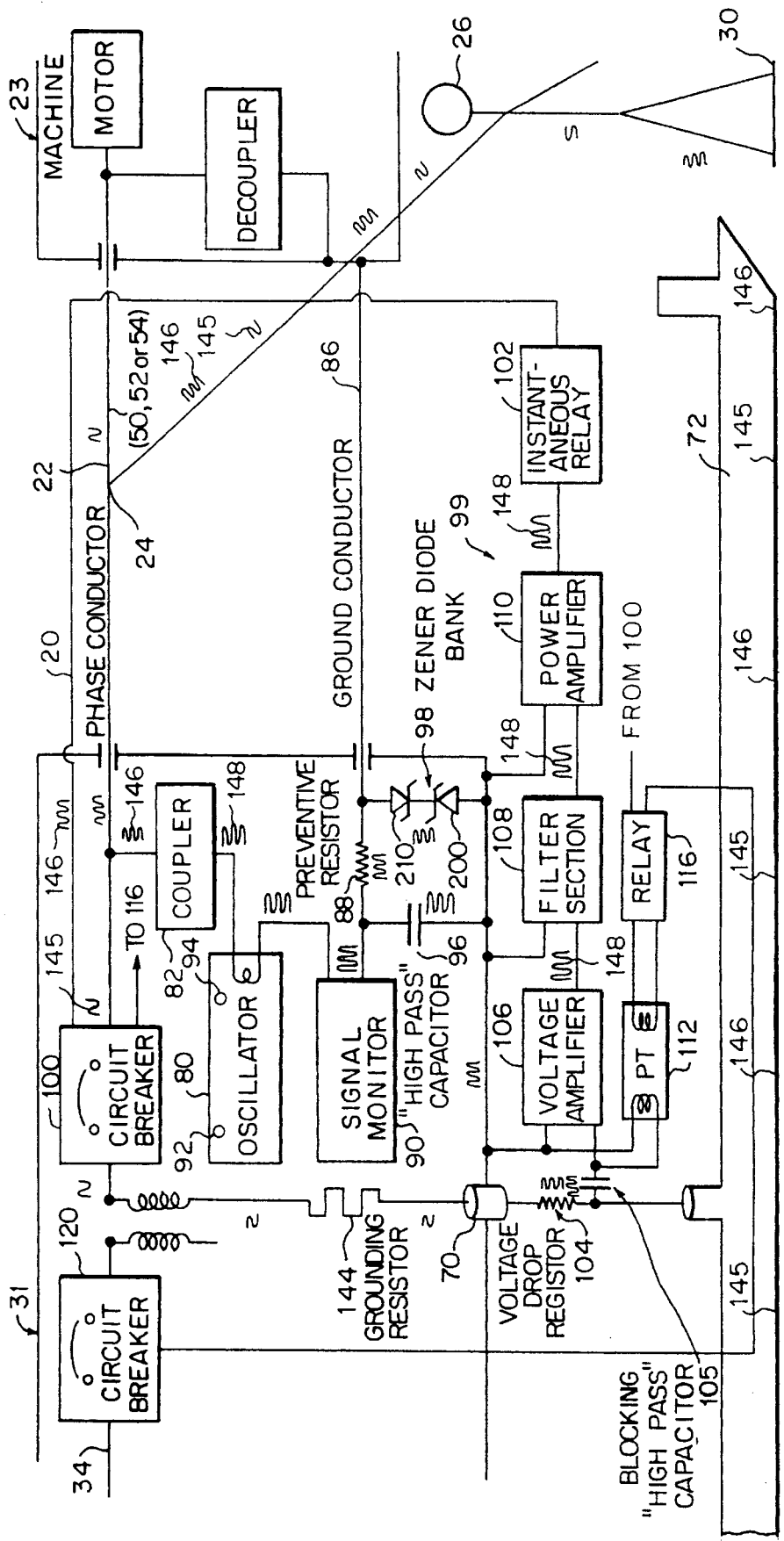
FIG. 11 is a schematic view similar to FIG. 8 illustrating a frequency analysis of the system in accordance with the present invention.

Referring now to FIGS. 10 and 11, operation of the system when there is no fault is compared to operation of the system when there is a fault. Assume, for example, the machine 23 is a shuttle car receiving 480 p-p volts from the secondary winding 42 of the transformer in the power center 20 through a trailing cable 22. For purposes of clarity, only one of the phase conductors 50, 52 or 54 is shown since only one machine 23 is being considered. The path of the fault current is illustrated by arrows 140. The signals 140 and 141 pass through a miner 26 who has contacted one of the phase conductors 50, 52 or 54 in the cable 22 at a fault location 24. Signal 142 is the output signal from instantaneous relay 102 to circuit breaker 100 while signal 143 is the output signal from relay 116 to main circuit breaker 120. Signal 144 is the internal signal within the sensor system 99 which is processed by the components of the system and trips instantaneous relay 102.

FIG. 11 is similar to FIG. 10 but shows the paths of a fault current signal, illustrated by the frequency signal 145, the HARRT sensor signal, illustrated by frequency signal 146, and a special sensing signal illustrated by frequency signal 148.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE

The oscillator 80 of FIGS. 10 and 11 produces a signal 146 at 10 volts and 7000 Hz and the signal is passed through the coupler 82 and is applied to the phase conductors 50, 52 and 54. The decoupler 84 removes the signal 146 at the machine 23 (which may be a vehicle) and returns it over ground conductor 86 through the preventive resistor 88. The signal monitor 90 verifies the presence of the signal 146 and indicates correct operation with the green light 92 connected to the signal monitor 90. All of the signal re-enters the oscillator 80.

The aforedescribed process may continue, for example, during the first and second shifts at a mine, which in a typical coal mine may be 16 hours. During the third shift, a spot in the cable 22 wears through, exposing a live conductor 50, 52 or 54. A coal miner 26 may notice that coal is laying on the cable 22 and decides to free the cable but, unfortunately, grabs the cable at the fault location 24. Upon grabbing the cable 22 at the fault location 24, the miner 26 is immediately exposed to 277 phase to neutral (p-n) volts. When a person contacts only one of the conductors of a p-p system, they are subject to only the p-n voltage. Accordingly, 277 is equal to 480/sqrt(3) which is how you calculate the p-n voltage in a p-p system. Had the miner 26 contacted two phases, one hand on one phase and one hand on another, the miner would have been subjected to 480 p-p volts. The path 30 of the fatal fault current 145 now flowing through the coal miner 26 is initiated by the respective coil of the secondary winding 42 of the transformer in the power center 20 and feeds current to the particular conductor 50, 52 or 54, that the coal miner is touching. The current travels down the cable 22 and enters the body of the coal miner 26 at the fault 24. The current then travels through the body of the miner 26 through ground path 30 and enters the power center 20 at the base 72 thereof. The current then travels up the designated conductor 70 from the base 72, through the voltage drop resistor 104 and grounding resistor 44 and then back to the secondary winding 42 of the transformer connected to the phase conductor 50, 52 or 54 touched by the miner 26.

As the fault current 145 with 60 Hz frequency traverses this path, the hazardous amperage recognition signal identified by arrows 141 and frequency signal 146, also enters the body 26 of the miner at the fault 24 in the exposed cable 22 and follows a path to the base 72 of the power center 20. This signal 141 also passes through the designated conductor 73 and voltage drop resistor 104 but then detours to pass through the zener diode bank 98, high pass capacitor 96, preventive resistor 88, and signal monitor 90 before re-entering the oscillator 80.

Two voltage drops with two different frequencies 145 and 146 now appear across the voltage drop resistor 104. One voltage drop has a frequency of 60 Hz (fault current frequency 145) and has a value equal to the product of the amount of fatal fault current times the value of the voltage drop resistor 104. The other voltage drop has a frequency of 7000 Hz (frequency 146) and a value equal to the product of the amount of current in that signal times the value of the voltage drop resistor 104. The 7000 Hz signal passes through the blocking high pass capacitor 105 and reaches the voltage amplifier 106 to produce the special sensing system frequency 148. The 60 Hz voltage drop signal is blocked by the high pass capacitor 105. The blocking high pass capacitor 105 has a cut-off frequency permitting the passage of all hazardous amperage recognition frequencies 146 but always blocks the 60 Hz signal 145 of the fatal current 140. The capacitor 105 protects the delicate circuitry of the sensing apparatus 99 from dangerous elevated voltages that could appear across the voltage drop resistor 104 and provides a means for closely approximating what voltage the voltage amplifier 106 amplifies. Upon the voltage amplifier 106 amplifying the 7000 Hz signal 146 to produce the special sensing system signal 148, the signal is then sent to fifteen different filter sections 108 (see FIG. 9). Only the filter section 108 that has a band pass filter to pass 7000 Hz will pass the signal 148. The fourteen other filter sections 108 filter out or block the 7000 Hz signal 146. For example, one filter network 108 of FIG. 9 will pass the 7000 Hz signal 146 and all of the other filter networks will block the 7000 Hz signal. The 7000 Hz signal 146 amplified to the special sensing circuit signal 148 is then passed by the filter network 108 to the power amplifier 110 which adds current to the signal and forwards it to the relay 102. The relay 102 instantaneously trips the circuit breaker 100 which is connected to the conductors (50, 52, 54) of the=cable 22 on which the fault 24 occurs, preventing current from continuing to flow through the coal miner 26 and thus preventing serious injury or saving his or her life.

The entire, aforedescribed process from the initial contact by the coal miner 26 with the fault 24 created by an exposed conductor 50, 52 or 54 in the cable 22 consumes less than ½ (0.5) second. Exposure for ½ second to a low amperage current is not extensive enough to cause injury to a human being, thus the coal miner is spared.

If the sensing apparatus 99 fails to operate correctly, the potential transformer 112 picks up the 7000 Hz signal 146 or HARRT current 141 and notifies the relay 116. The relay 116, after a short time delay, trips the circuit breaker 120 connected to power main 34 which supplies all of the power for the power center 20. All cables 22 are then de-energized. The time delay in the relay 116 also de-energizes the system in less than ½ second of initial contact with the exposed cable 22 so as to prevent injury to or the death of the coal miner 26.

There is one other type of current, capacitative coupling current, that could adversely effect the proper operation of the system. Capacitative coupling current is the current that flows from the cable 22 to the earth 28 and back to the base 72 of the power center 20 under normal operation with no conductors 50, 52 or 54 touching the earth. The instantaneous relay 102 and the PT relay 116 therefore have adjustable trip levels. This means that the relays 102 and 116 will only trip their respective breaker 100 and 120 at current values or levels above the trip level, and this level is adjustable. The adjustable trip levels on both relays 102 and 116 will be set above the level of the capacitative coupling current to eliminate false tripping.

ZENER DIODE SUBSYSTEM

Referring now to FIGS. 12–18, where a capacitor, resistor, zener diode system (CRZ) is disclosed, it is seen that the zener diode bank 98 is used in combination with the system set forth in FIGS. 1–11 but has unique characteristics of its own.

Every cable 22 is connected to the power center 20 by means of inserting its plug into the power center's receptacle. The ground wire pin in the cable's plug must not be allowed to directly contact or have an indirect electrical path to the frame of the power center. Instead, it must be completely insulated from the frame 32 of the power center 20 and be allowed to pass straight through to its own zener diode bank, preventive resistor, and "high pass" capacitor, as previously shown in FIGS. 7 and 8. There is separate zener diode bank 98 preventative resistor 88 and high pass capacitor 96 for each cable 22.

Figure 12A:
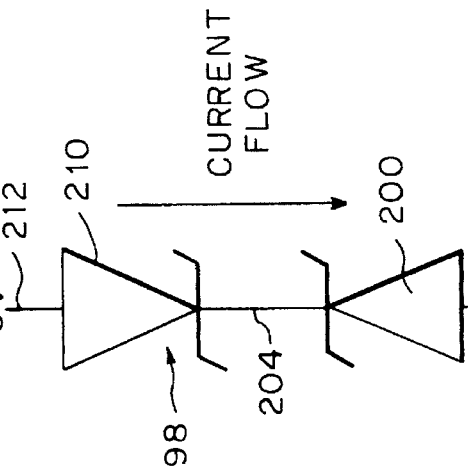
FIGS. 12(a)–12(c) are schematic views of zener diodes used to configure an intermachine arcing prevention circuit in accordance with the present invention.

A zener diode 200 is disclosed in FIG. 12a and is comprised of terminals 202 and 204. If voltage is applied to line 204, the voltage across the terminals 204 and 202 must be above a selected, built-in value in order to push current. If the zener diode 200 is a 7-volt zener diode, in order for current to flow from the terminal 204 to the terminal 202, the voltage pushing the current must be 7 volts or greater. If the bottom terminal is at 2 volts, then the top terminal must be at 9 volts or greater to produce current flow. Once current is flowing through the top 206 of the zener diode 200, the zener diode functions essentially as a straight wire conductor. Like a straight wire conductor, the zener diode 200 has little resistance and, once current begins to flow therethrough, the zener diode 200 presents no effective resistance to the current.

Figure 12B:
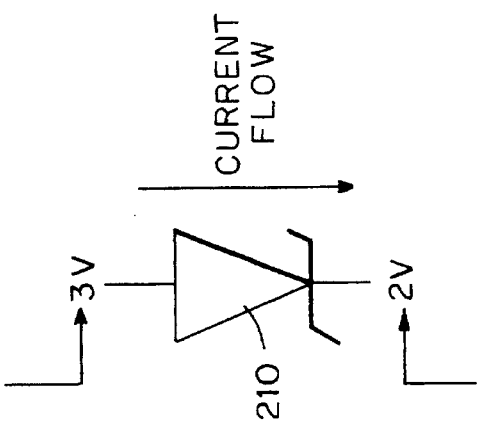

Current may also be forced through the bottom of the zener diode 200 via terminal 202. When current is forced through the bottom of the zener diode 200, the voltage difference does not have to be as great. Usually, the voltage difference of about 1 volt is all that is required. Accordingly, as is seen in FIG. 12b, if the top terminal 204 of the zener diode 200 is at a voltage level of 2 volts, then the bottom terminal need only be at 3 volts for current to flow. Again, once current starts to flow, it encounters no effective resistance.

Figure 12C:
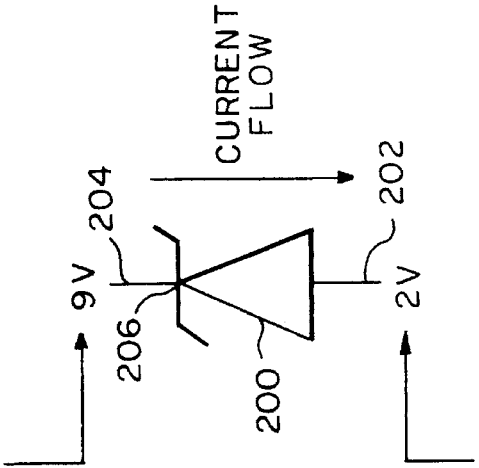

Referring now to FIG. 12c where the zener diode bank 98 is employed (the zener diode bank 98 is used in the circuitry of FIGS. 1–11), it is seen that the zener diode bank is simply two zener diodes 200 and 210 connected in the circuit by bottom electrodes 202 and 212, respectively. In order for current to flow through the bank 98 in any direction, the current difference must be 8 volts or greater. Choosing any direction one desires and considering FIGS. 7, 8 or 10, it is seen that the voltage must overcome 7 volts of the first zener diode 200 or 210 it encounters in order for current to flow. The 7 volts and the 1 volt together produce a total of 8 volts. The zener diode bank 98 is important because it blocks all voltage with low amplitudes, regardless of frequency.

SUPPRESSION OF INTERMACHINE ARCING

Figure 13:
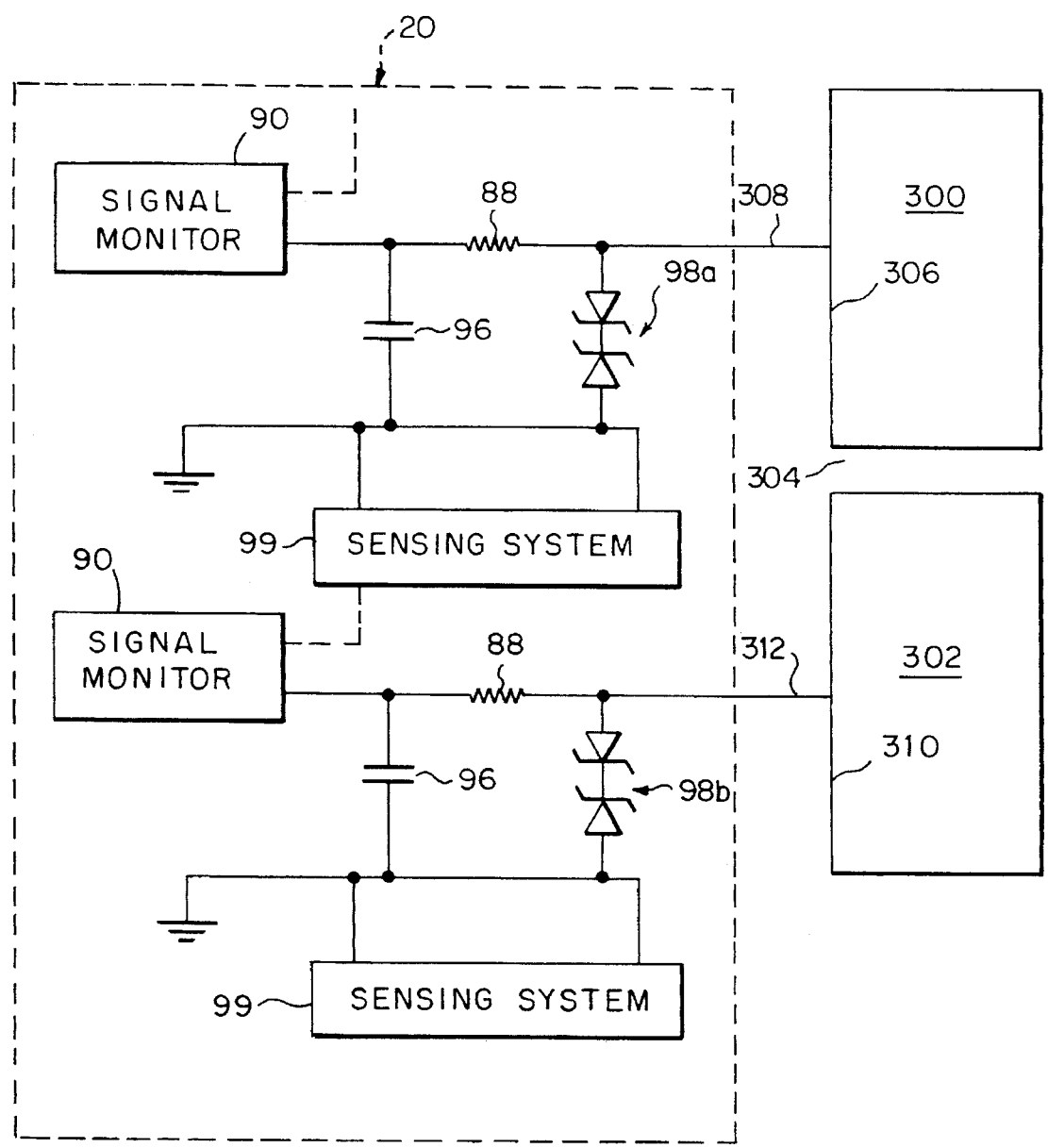
FIG. 13 is a block diagram illustrating coal mining machinery in close proximity.

Referring now to FIG. 13, a pair of machines 300 and 302 are shown. The zener diode bank 98 prevents arcing between the machines 300 and 302. This arcing is known as intermachine arcing and is a phenomenon in coal mines that occurs when vehicles and machines are coming into contact with one another, when they are separating from one another, or when there is a thin air gap 304 between the machines which is very, very small.

As is seen in FIG. 13, the current which causes intermachine arcing follows a path from the frame 306 of the first machine 300 to the power center 20 along a first ground wire 308 where it flows through a first zener diode bank 98a for the first machine. The current then flows through a second zener diode bank 98b for the second machine 302 and to the frame 310 of the second machine through ground wire 312. The current passes from machine 300 to machine 302 or vice versa when the machines are touching or when the machines are separated by the thin air gap 304.

Current flowing between machine frames 306 and 310 has a low amplitude and a low frequency. Accordingly, the zener diode banks 98a and 98b will not permit passage of the current when the machines are touching. When current flows between the machine frames 306 and 310 via the air gap 304, the voltage that causes the current flow has a low amplitude and a high frequency. Again, the zener diode banks 98a and 98b do not allow current to pass. This phenomenon results in a need for the preventive resistor 88 (see FIGS. 7–11).

As stated, when current flows between the machine frames 306 and 310 through the air gap 304, the current has a high frequency. If a preventive resistor were not installed for each cable, the current would go through the high pass capacitors 96 (FIGS. 7–11) and not through the zener diode banks 98. This would defeat the purpose of the zener diode banks 98 because sparks would no longer be inhibited. By using the preventive resistor 88 and providing the preventing resistor with a high Ohmic value, e.g., 1000 Ohms, current is dissipated regardless of the path it attempts to follow. The preventive resistors 88 therefore prevent the high pass capacitors 96 from negating the essential function of the zener diode banks 98.

The configuration and placement of the zener diode bank 98 is necessitated by the requirement for protective relaying in a ground fault situation. A ground fault occurs when a phase conductor 50, 52 or 54 comes into direct or indirect contact with the ground wire 86. When this situation occurs in a particular cable 36, the cable must be de-energized. In order to de-energize the cable, a relay through its sensor must be able to sense the occurrence of a ground fault and trip the appropriate circuit breaker. In order to sense the occurrence of the ground fault, the relay sensor must be able to sense the current that flows during a ground fault. The current that flows during a ground fault and the voltage which causes this current flow is high amplitude, low frequency voltage and current, e.g., 277 volts at 60 Hz.

The current flow that flows during a ground fault leaves the particular coil of the secondary winding 42 of the transformer providing power to the particular cable conductor 50, 52 or 54 where the fault is occurring. The current then flows down the conductor 50, 52 or 54 and enters the ground wire 86 at the location of the fault. The current then travels back to the power center 20 along the ground wire 86, up the grounding resistor 44 and enters the particular coil of the secondary transformer 42 connected to the phase conductor 50, 52 or 54 which has touched the ground conductor. In this situation, the zener diode bank 98 provides the primary path for the fault current to pass through the CRZ system comprised of the high pass capacitor 96, resistor 88 and zener diode bank 98. The fault current can only barely pass through the preventive resistor 88 and the high pass capacitor 96 but can easily pass through the zener diode bank 98 and return to the secondary winding 42 of the transformer in the power center 20. If there were no zener diode bank 98, then there would not be a good unimpeded path for the fault current. The amount of current would therefore not be sufficient for a ground fault sensor to measure and one would never know when a ground fault was occurring. Accordingly, the zener diode bank 98 makes relaying protection for ground faults possible.

While the zener diode bank 98 is preferred, other zener diode embodiments illustrated in which zener diodes are in parallel with the two diodes 200 and 210 of the first embodiment are possible. Accordingly, there may be a total of more than two zener diodes in the zener diode bank as shown in the Figures; however, the bank will function in the substantially same manner.

In the preferred embodiment, a blocking capacitor 105 is used; however, the blocking capacitor can be replaced with an equivalent high pass filter as is suggested in FIG. 5.

In order to effectively realize ground wire monitoring the sensors 90 (FIG. 7) or signal monitors (FIGS. 8, 10 and 11) are tied into their circuit breakers 100 on their respective cables 36. This is accomplished via their instantaneous relays 102 which are located in the special sensing systems 99 associated with their respective cables 22. When a ground wire 86 is broken, the sensor 90 on the cable 22 that the broken ground wire is in, alerts its instantaneous relay 102 to trip its associated circuit breaker 100. The sensors will have band pass filters that pass and exclude the same frequencies that their respective filter sections 108 (in their special sensing systems 99) pass and exclude. The band pass filters prevent the signal of one oscillator 80 from reaching another sensor 90 so as to prevent ground wire monitoring capabilities, a phenomenon called "cross talk".

The green and red lights 92 and 94 on the signal monitor 90 indicate correct flow (green light) or incorrect flow (red light) of the HARRT's signal through its respective oscillator 80, coupler 82, decoupler 84, and ground wire 86. The red light 92 also lights up when the circuit breaker 100 trips due to the ground wire 86 breaking. Also, if there is a sudden malfunction in the oscillator 80, coupler 82, or decoupler 84, the sensor 90 will trip the circuit breaker 100 and the red light 94 will come on. A separate orange light is added to illuminate when the circuit breaker 100 is tripped due to operation of the HARRT special sensing system 99.

Referring now to FIGS. 14a–14d, the essential equations to notice are the equations for t, f1, f2, Vgf(t), Varc(t), Vharrt(t) and Vsys(t). The variable "t" stands for time and the equation uses a time span of one to one hundred seconds. The constant "f1" is the frequency for the ground fault current, and the intermachine arcing current, and is sixty hertz. The constant "f2" is the frequency for the HARRT's signal and in the following example is six thousand hertz. As has been previously emphasized, HARRT has a different frequency for each cable 22 leaving the power center 20. The variables Vgf(t), Varc(t), and Vharrt(t), represent the voltages for the ground fault voltage, intermachine arcing voltage, and the HARRT signal voltage, respectively. The voltage Vsys(t) is the sum of the three voltages and is the total system voltage that the crz system will have to see. These voltages as a function of time are seen in FIGS. 14(a)–14(d).

The purpose of the crz (capacitor, resistor, zener diode) system 96, 88, 98 is to block one type of voltage, while passing two other types of voltages. Since the crz system 96, 88, 98 affects three different voltages, it also affects the three currents associated with those voltages. The three different voltages and currents are: the voltage and current that are produced during a ground fault, the voltage and current that are produced during the intermachine arcing, and the HARRT generated voltage and current that flows through a coal miner 26 when he or she has touched an exposed place 24 on a cable 22. We can represent the voltages with the following equations.

$t = 1 \ldots 100$ secs.

Figure 14A:
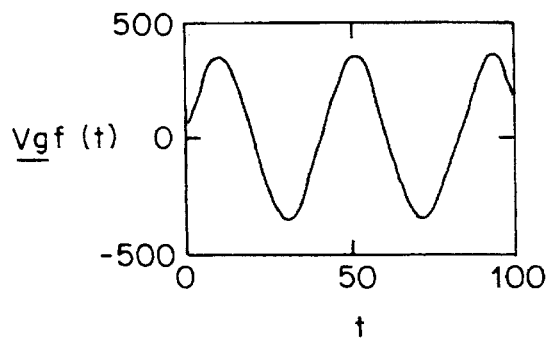
FIGS. 14(a)–14(d) are graphs plotting voltages as a function of time.
Figure 14B:
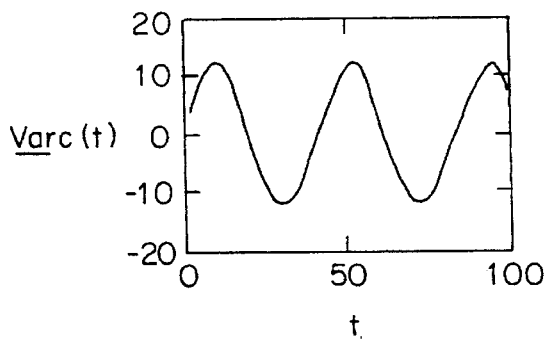
Figure 14C:
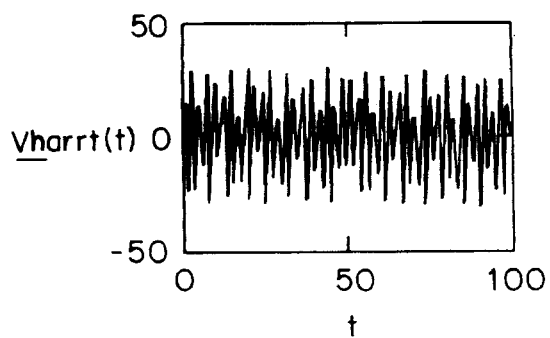
Figure 14D:
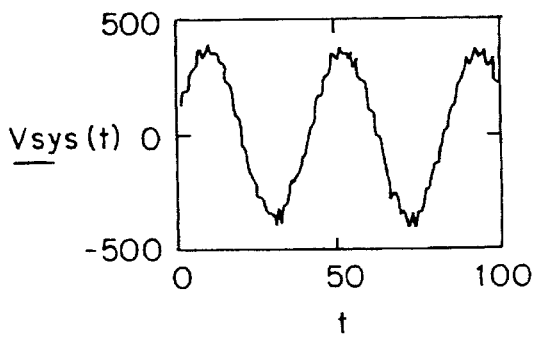

$x = 22/7$ $f1 = 60$ Hz $f2 = 6000$ Hz $\omega 1 = 2 \cdot x \cdot f2$ $\omega 2 = 2 \cdot x \cdot f2$ $\omega T = \omega 1 + \omega 2$ $Vgf(t) = 350 \cdot \sin[\omega 1 \cdot t]$ $Varc(t) = 12 \cdot \sin[\omega 1 \cdot t]$ $Vharrt(t) = 30 \cdot \sin[\omega 2 \cdot t]$ $Vsystem(t) = Vgf(t) + Varc(t) + Vharrt(t)$ The positive and negative magnitude of Vgf(t) equals three hundred and fifty volts, the positive and negative magnitude of Vharrt(t) equals thirty volts, and the positive and negative magnitude of Varc(t) equals twelve volts. All of the voltages hit their positive magnitude, pass through zero volts, and then go to their negative magnitude. This process repeats continuously. The positive and negative magnitude of the ground fault voltage Vgf(t) is much higher than that of the Vharrt(t) and Varc(t). In FIG. 14(c), the voltage of HARRT's signal appears compact on the plot because the frequency is so high.

The magnitudes of the voltages is important because the crz system is a voltage controlled, resistance (or impedance) system. Due to Ohms law, the value of the impedance, which is controlled by the magnitude of the voltage or voltages across the crz system 96, 88, 98, in turn controls the amount of current that flows. Therefore, if the voltage is constant, more impedance will cause less current to flow, and less impedance will cause more current to flow.

Figure 15A:
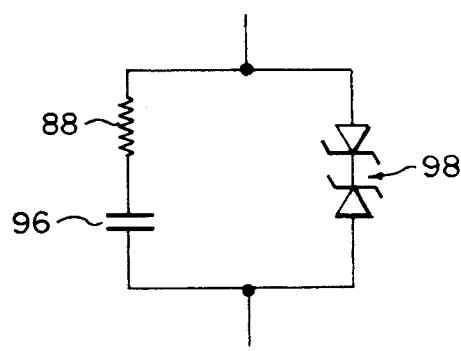
FIGS. 15(a) and 15(b) are impedance circuits presented to oppose current flow.
Figure 15B:
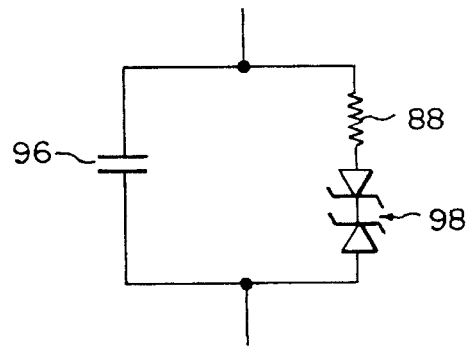

Referring now to FIGS. 15(a) and 15(b), because of the way the three voltages and currents are in contact with the crz system 96, 88, 98, there are two separate impedance circuits that the crz system will present to oppose the flow of current.

FIG. 15(a) illustrates how the ground fault voltage and current, and the intermachine arcing voltage and current, come in contact with the crz system 96, 88, 98. FIG. 15(b) illustrates how the HARRT generated voltage and current comes in contact with the crz system 96, 88, 98. The circuit of FIG. 15(a) is referred to as crz impedance one (Zcrz1(t)), and the circuit of FIG. 15(b) is referred to as crz impedance two (Zcrz2(t)). The two crz impedances are series and parallel combinations of the individual impedances of the capacitor 96, resistor 88, and zener diode bank 98. These individual impedances are shown on the second line of the following equations.

$C = 1 \cdot 10^{-6}$
$R = 1000$
$Z(t) = \text{if}[|Vsys(t)| > 8, 0.25, 1 \cdot 10^{10}]$ $Xc = \dfrac{1}{[\omega t \cdot C]}$ $Xr = R$
$Xz(t) = Z(t)$ Calculating crz impedance one, and crz impedance two:

$Zcrz(t) = \dfrac{((Xr + Xc) \cdot Xz(t))}{((Xr + Xc) + Xz(t))}$ $Zcrz2(t) = \dfrac{(Xc \cdot (Xr + Xz(t)))}{((Xc + (Xr + Xz(t)))}$ The crz system 96, 88, 98 must not impede the current that flows during a ground fault. Limiting this current would prevent the protective relaying of a ground fault occurrence. The crz system 96, 88, 98 must not impede the current that flows from HARRT's signal as it flows through the person 26, ground 28, base 72 of the power center 20, voltage drop resistor 104, crz system 96, 88, 98, and sensor 90, before it reaches HARRT's oscillator 80. Limiting this current would reduce or prevent the voltage drop across the voltage drop resistor 104, thereby negating HARRT's ability to remove the deadly voltage and current. Since intermachining arcing can detonate explosive gases and particles in a coal mine, the crz system 96, 88, 98 must impede and/or block the current that flows during intermachine arcing. The mathematical and graphical analysis that follows establishes that the crz system meets these criteria.

Figure 16:
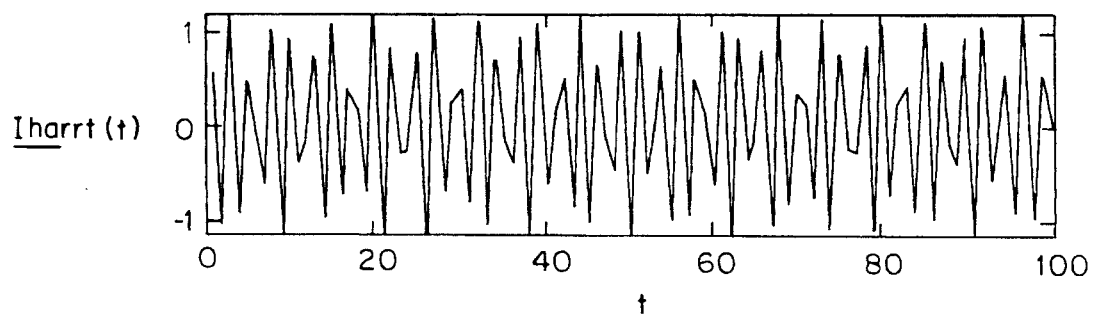
FIG. 16 is a graph potting amperages as a function of the time of hazardous amperage recognition in the relaying technique in accordance with the present invention and referred to as HARRT in this application.

Referring now to FIG. 16, it is seen that the current that Harrt's signal generates is not impeded. The equation for the current referred to herein as "Iharrt(t)" is as follows:

$$Iharrt(t) = \frac{Vharrt(t)}{Zcrz2(t)}$$

From FIG. 16, it is seen that Iharrt(t) exceeds 1 amp. This is more than enough current from HARRT's sensing apparatus to sense. Therefore, the current from HARRT's signal is not impeded.

Figure 17:
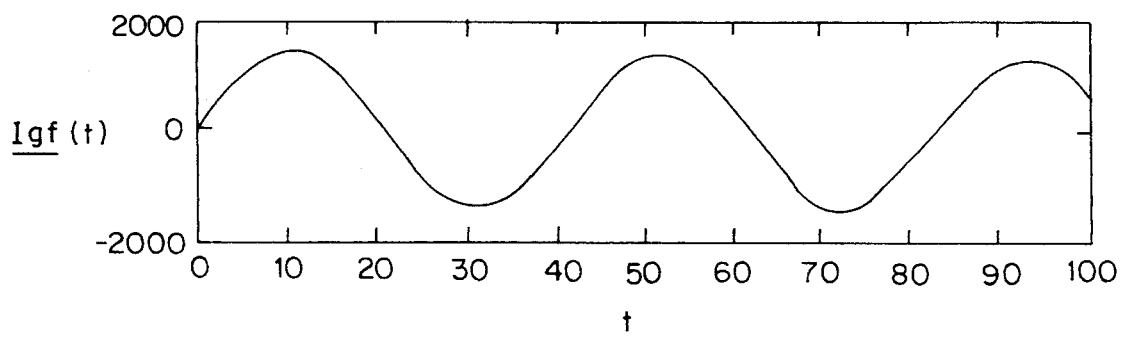
FIG. 17 is a graph plotting amperage as a function of time for ground fault detections.

Referring now to FIG. 17, it is seen that the current generated from a ground fault is not impeded. The equation for the current, referred to herein as Igf(t) is as follows:

$$Igf(t) = \frac{Vgf(t)}{Zcrz1(t)}$$

From the graph of FIG. 17, it is seen that Igf(t) is well over a thousand amps. This is more than enough current to provide protective relaying for a ground fault. Therefore, the current from a ground fault is not impeded.

Figure 18:
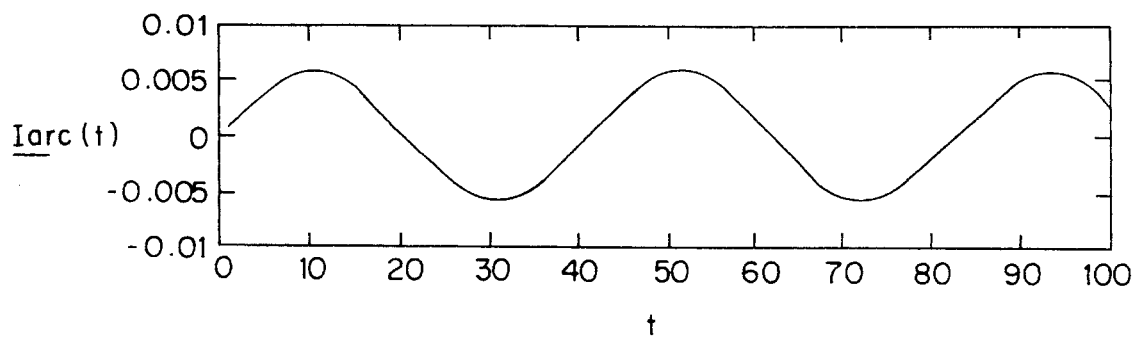
FIG. 18 is a graph plotting amperage as a function of time for intermachine arcing.

Referring now to FIG. 18, it is seen that the current flowing during intermachine arcing is impeded. Remember, the intermachine arcing current must pass through two crz systems 88, 96, 98. The current, referred to herein as Iarc(t) is computed as follows:

$$Iarc(t) = \frac{Varc(t)}{(Zcrz1(t) + Zcrz1(t))}$$

From the graph of FIG. 18, it is seen that Iarc(t) is barely over 5 milliamps (0.005 amps). Therefore, unlike the other two currents, the current Iarc(t) is greatly impeded. According to government regulations, the amount of arcing current illustrated in FIG. 18 is considered safe.

In summary, it is seen from the mathematical and graphical analysis that the crz system 88, 96, 98 performs its three important criteria. It is therefore correct to say that the crz system 88, 96, 98 passes all of HARRT's signals as well as the ground fault current, yet blocks intermachine arcing current.

DEFINITIONS 1) fault - a point of defect in a circuit through which current is flowing along an undesired path.

2) fault current - the current that is flowing along an undesired path (e.g., a person's body). We will only be concerned with the fault current that would flow through a human. The path of this current is shown in FIG. 1. The current leaves the cable at the fault, enters the miner's body, travels through his/her body, travels through the ground, and arrives back at the source of the electrical current, which is called the power center.

3) power center - a large metal "box", filled with complex electrical components, that supplies power to the machinery and vehicles in the coal mine (FIGS. 2 and 3). It supplies power by transforming (with the use of a transformer) incoming power to lower levels of power. The power center is where fault current returns even if it passes through a distribution box or a switchhouse (not shown). The power center may be an alternating current, direct current, or an alternating current and direct current power center.

4) trailing cable - the cable that supplies the electrical power to machinery and vehicles that are frequently in motion. In coal mines these cables are constantly moved, reeled, and handled. Most accidents and fatalities occur with these types of cables (see FIG. 4).

5) hazardous amperage - fault current 6) protective relaying - the "cutting off" of electrical power with the use of circuit breakers and relays. The relays, through their individual sensors, sense fault conditions, and trip the circuit breaker that is on that cable. There is one circuit breaker per cable and it safely removes the power from each of the three phase conductors in that cable when one of the relays "tells it to do so".

7) "high pass" high pass refers to a device that only permits high frequency electrical current to pass through itself. For example (see FIG. 5), a high pass device with a cut off frequency of 500 Hertz (Hz) permits all current with frequencies higher than 500 Hz (e.g., 1000 Hz) to pass through itself, while cutting off all current with frequencies that are 500 Hz and lower. The name "high pass" is placed in quotes because its definition here is modified slightly from its normal electrical engineering definition.

8) voltage - the electrical force and pressure that pushes current through a conductor.

9) current - the flow of electrical charge through a conductor. Whenever there is current flow, there is a voltage pushing it.

10) HARRT and harrt - an acronym for "hazardous amperage recognition and relaying techniques."

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A safety system for detecting and rendering harmless faults in an electrical power system which includes a power center for distributing electrical power to a plurality of machines wherein the power center receives current from a main power line and includes a primary winding and a secondary winding arrangement wherein the secondary winding arrangement is connected to a plurality of power cables which are in turn each connected to at least one electrical machine, the safety system including a current interrupter for interrupting power to a specific power cable; the safety system comprising:

oscillators for placing different frequencies on each cable connecting a machine to the power center;

a structure for electrically connecting the power center to the earth so as to provide an electrical path through a person should the person touch an exposed conductor of one of the cables;

a primary sensor circuit for sensing each of the frequencies applied to the cables, which primary sensor circuit is electrically located in a fault current sensing region; and a circuit connected to the current interrupter for causing the current interrupter to interrupt power to the cable having an exposed conductor upon detecting the frequency applied to that cable.

2. The safety system of claim 1 further including a secondary sensor circuit for interrupting power from the main power line to the power center after a selected time delay if the primary sensor circuit has not interrupted power from the faulty cable attached to the secondary winding arrangement of the transformer, which secondary sensor circuit is electrically located in a fault current sensing region.

3. The safety system of claim 1 further including a zener diode bank, preventive resistor, and high pass capacitor configured to pass the different frequencies of the oscillators while also passing ground fault current but blocking intermachine arcing.

4. The safety system of claim 1, wherein the system for electrically connecting the power center to the earth includes a metal frame for supporting the power center and a base for supporting the frame, the base resting on the earth and being electrically insulated from the frame of the power center except for a conductor, the conductor establishing a fault current sensing region through which all human fault current must pass.

5. The safety system of claim 3 further including a separate zener diode bank, preventive resistor, and high pass capacitor to ground each machine to the frame of the power center by the electrical placement of the zener diode bank, preventive resistor, and high pass capacitor between the ground conductor of the cable of the machine and the frame of the power center.

6. The safety system of claim 1 further including, in the primary sensor circuit, a separate filter for each cable supplying power from the power center, each filter passing only the specific frequency applied to the cable to which it is assigned, but blocking all of the other frequencies of the other cables, so that only one filter in the primary sensor circuit will pass the frequency applied to the faulty cable.

7. The safety system of claim 1 further including indicators in the form of red and green and orange lights wherein the red light is illuminated upon the occurrence of incorrect operation of the system and a broken ground wire, the orange light is illuminated when the primary sensor circuit interrupts power to a cable and the green light is illuminated during normal non-fault operation.

8. A method of detecting and rendering harmless faults in an electrical power system which includes a power center for distributing electrical power to a plurality of machines wherein the power center receives current from a main power line and includes a primary winding and a secondary winding arrangement wherein the secondary winding arrangement is connected to a plurality of power cables which are in turn each connected to an electrical machine, the power system including a current interrupter for interrupting power to the cables, the method comprising:

placing different frequencies on each cable connecting a machine to the power center;

establishing an electrical path through the power center and earth so as to provide an electrical path through a person should the person touch an exposed conductor in one of the power cables;

sensing each of the frequencies applied to the cables; and interrupting power to a cable upon detecting a specific frequency applied to a specific cable.

9. The method of claim 8 further including interrupting power from the main cable to the power center after a selected time delay if power has not been interrupted to the power cable having the exposed conductor.

10. The method of claim 8, wherein the electrical path is established by a base in contact with the earth which base is generally insulated from the metal frame.

11. The method of claim 8, including using a zener diode bank, a preventive resistor, and a high pass capacitor to pass the different frequencies of the oscillators while also passing ground fault current but blocking intermachine arcing.

12. The method of claim 11 further including the step of grounding each machine to the frame of the power center by placing a zener diode bank, a preventive resistor, and a high pass capacitor between the ground conductor in the power cable of the machine and the frame of the power center.

13. The method of claim 8 wherein the power center includes a frame and the method further includes the steps of providing the frame of the power center with a base and electrically contacting the earth with the base while electrically insulating the frame from the base, and further includes the step of establishing a fault current sensing region with a conductor connecting the base to the frame through which all human fault current must pass.

14. The method of claim 8 further including the step of using a separate filter for each cable supplying power from the power center, each filter passing only the specific frequency applied to the cable to which it is assigned, but blocking all of the other frequencies of the other cables, so that only one filter will pass the frequency of the faulty cable.

* * * * *